United States Patent
Mayer et al.

(10) Patent No.: US 10,150,376 B2
(45) Date of Patent: Dec. 11, 2018

(54) ENERGY TRANSFER SYSTEM AND METHOD FOR THE DIAGNOSIS OF AN ENERGY TRANSFER SYSTEM

(71) Applicant: Robert Bosch GmbH, Stuttgart (DE)

(72) Inventors: Markus Mayer, Heilbronn (DE);
Florian Malchow, Stuttgart (DE);
Markus Becker, Tamm (DE); Steffen Eppler, Ludwigsburg (DE); Philipp Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 15/037,855

(22) PCT Filed: Oct. 27, 2014

(86) PCT No.: PCT/EP2014/073009
§ 371 (c)(1),
(2) Date: May 19, 2016

(87) PCT Pub. No.: WO2015/074838
PCT Pub. Date: May 28, 2015

(65) Prior Publication Data
US 2016/0288655 A1    Oct. 6, 2016

(30) Foreign Application Priority Data

Nov. 21, 2013   (DE) .................. 10 2013 223 794

(51) Int. Cl.
*H02J 7/00* (2006.01)
*H02J 7/14* (2006.01)
(Continued)

(52) U.S. Cl.
CPC ......... *B60L 11/182* (2013.01); *B60L 11/1829* (2013.01); *H02J 7/025* (2013.01);
(Continued)

(58) Field of Classification Search
USPC ......... 320/108, 109, 103, 107; 307/104, 9.1, 307/10.1
See application file for complete search history.

(56) References Cited

U.S. PATENT DOCUMENTS 9,827,864 B2 * 11/2017 Asai ................. B60L 11/182
2012/0187757 A1   7/2012 Wechlin et al.
(Continued)

FOREIGN PATENT DOCUMENTS

CN    102694423 A    9/2012
CN    203039384 U    7/2013
(Continued)

OTHER PUBLICATIONS

International Search Report for Application No. PCT/EP2014/073009 dated May 13, 2015 (English Translation, 2 pages).

*Primary Examiner* — Alexis Pacheco
(74) *Attorney, Agent, or Firm* — Michael Best & Friedrich LLP

(57) ABSTRACT

The present invention relates to an inductive energy transfer system and a method for the diagnosis of a foreign object detection of an inductive energy transfer system. For this purpose, a defined fault is introduced into the region to-be-monitored between primary coil and secondary coil of the inductive energy transfer system, and the response of the foreign object detection to said defined fault is then evaluated.

7 Claims, 3 Drawing Sheets

(51) Int. Cl.
  *B60L 11/18* (2006.01)
  *H02J 7/02* (2016.01)
  *H02J 50/10* (2016.01)
  *H02J 50/60* (2016.01)

(52) U.S. Cl.
  CPC .............. *H02J 50/10* (2016.02); *H02J 50/60* (2016.02); *B60L 2230/16* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 2012/0228952 A1* | 9/2012 | Hall | .......................... | H03H 7/40 307/104 |
| 2012/0228953 A1* | 9/2012 | Kesler | ..................... | H03H 7/40 307/104 |
| 2012/0262002 A1 | 10/2012 | Widmer et al. | | |
| 2012/0313742 A1* | 12/2012 | Kurs | ..................... | B60L 11/182 336/180 |
| 2013/0069441 A1* | 3/2013 | Verghese | ................ | G01R 33/10 307/104 |
| 2014/0015329 A1* | 1/2014 | Widmer | ................ | G01D 5/2006 307/104 |
| 2014/0021908 A1* | 1/2014 | McCool | ................ | B60L 11/182 320/108 |
| 2014/0111154 A1* | 4/2014 | Roy | ....................... | G01V 3/081 320/108 |
| 2014/0132210 A1* | 5/2014 | Partovi | ................... | H02J 5/005 320/108 |
| 2016/0172891 A1* | 6/2016 | Filippenko | .............. | H02J 17/00 320/108 |

FOREIGN PATENT DOCUMENTS

| | | |
|---|---|---|
| DE | 102009033236 | 1/2011 |
| DE | 102011050655 | 11/2012 |
| JP | 2010183705 A | 8/2010 |
| JP | 2012127211 A | 7/2012 |

* cited by examiner

ENERGY TRANSFER SYSTEM AND METHOD FOR THE DIAGNOSIS OF AN ENERGY TRANSFER SYSTEM

BACKGROUND OF THE INVENTION

The present invention relates to a power transmission system and a method for diagnosing a power transmission system.

Inductive power transmission systems are known. Inductive power systems of this kind are used for charging the traction battery of an electrical hybrid vehicle, for example. During transmission of the power by an inductive charging system of this kind, strong magnetic alternating fields are produced in the air gap between primary coil and secondary coil. In this case, the magnetic field strength of such alternating fields increases in proportion to the reduction in the coil size of the coils used. The magnetic alternating fields that arise in this case can, from a certain strength upward have negative effects on the nervous system of living creatures, such as human beings or animals. Therefore inductive power transmission systems of this kind are equipped with an apparatus for detecting or identifying objects. When an object is detected in the air gap between primary coil and secondary coil in an inductive power transmission system, the capacity of the power transmission is then reduced or if need be the power transmission is stopped completely. The power transmission process can then be continued only when it is certain that there is no longer an object in the air gap of the inductive charging system.

One option for the identification of foreign objects in the air gap of the inductive power transmission system consists in conventional inductive metal detection by means of additional test coils that are excited in pulsed fashion. Other methods are based on 2- or 3-dimensional object identification methods.

The German patent application DE 10 2009 033 236 A1 discloses an apparatus for the inductive transmission of electric power from a stationary unit to a vehicle. The apparatus has a device for detecting the presence of an article within a predetermined space. The detection device has at least one contactless sensor and an evaluation device connected to the sensor. The sensor may be an ultrasonic, radar or infrared sensor or an electronic image sensor.

Foreign object identification is a safety-relevant function of the charging system. Therefore, the operational state needs to be made reliable if need be by means of redundant sensor systems and/or monitoring of the sensitivity of the sensor system. A malfunction in the foreign object identification needs to be reliably identified.

There is therefore a need for a power transmission apparatus for inductive power transmission that allows the foreign object identification to be monitored. In addition, there is also a need for a diagnosis method for a power transmission system with foreign object identification.

SUMMARY OF THE INVENTION

According to a first aspect, the present invention provides a power transmission apparatus for inductive power transmission from a primary coil to a secondary coil, having a detector that is designed to detect an object in the interspace between primary coil and secondary coil and to output a detection signal; an apparatus for introducing a disturbance that is designed to introduce a predetermined disturbance into the interspace between primary coil and secondary coil; and a diagnosis apparatus that is designed to actuate the apparatus for introducing a disturbance, to receive the output detection signal from the detector and to determine a piece of diagnosis information using the received detection signal from the detector.

According to a further aspect, the present invention provides a method for diagnosing an inductive power transmission system with foreign object monitoring, having the steps of introduction of a predetermined disturbance into a monitoring region of the foreign object monitoring; reception of a detection signal from the foreign object monitoring after the predetermined disturbance has been introduced into the monitoring region of the foreign object monitoring; and determination of a piece of diagnosis information using the received detection signal.

It is a concept of the present invention to equip a system for inductive power transmission with foreign object identification having an automatic self-test or diagnosis function. This is accomplished by providing an option to introduce a defined disturbance into the region that is to be monitored by the foreign object identification and then to evaluate the output signal from the foreign object identification in order to rate the operational state of the foreign object identification.

Such a diagnosis option allows an automatic self-test on the foreign object identification for an inductive power transmission. This means that it is possible to ensure perfect operation of the sensor system even after a relatively long operating period. Therefore, the previously required redundancy for the foreign object identification is no longer required to the full extent.

The diagnosis system according to the invention for the foreign object identification also allows the identification of a slowly appearing continuous deterioration of the sensor system by means of comparison with defined reference objects/signals.

The result of the diagnosis and any malfunctions detected can be stored in a fault memory and provided for later evaluation. This simplifies servicing and repair of the inductive power transmission system.

In one embodiment, the apparatus for introducing a disturbance varies the magnitude and/or the intensity of the introduced disturbance. By way of example, the effective diameter or the effective cross-sectional area of the introduced disturbance can be continuously enlarged or reduced so as to ascertain a response threshold for the detector. This, preferably progressive, variation of the introduced disturbance allows accurate determination of the limit value from which a foreign object is identified. It is therefore also possible to reliably diagnose a deterioration of the sensor system that may arise in insidious fashion.

In one embodiment, the apparatus for introducing a disturbance is designed to introduce a metallic object into the monitoring region. By way of example, a metallic object of a defined shape can be slowly introduced into the monitoring region from a region outside the monitoring region. Alternatively, a metallic object that is initially in a position with a relatively small effective cross section relative to the magnetic alternating field, and that has a larger effective cross section after altering its relative situation in relation to the primary coil or secondary coil, is also conceivable. It is therefore possible for the response of the foreign object identification to metallic objects to be verified in a reliable manner.

In one embodiment, the apparatus for introducing a disturbance is a heat source. Such a heat source can verify heat-based sensor systems, in particular, such as infrared sensors or the like, for example.

In one embodiment, the apparatus additionally comprises a memory apparatus that is designed to store the piece of diagnosis information determined by the diagnosis apparatus. This allows the diagnosis result from the memory apparatus to be precluded and analyzed even at a later time. By way of example, the memory apparatus may be the fault memory of a vehicle.

In one embodiment, the apparatus additionally comprises a display apparatus that is designed to display the piece of diagnosis information determined by the diagnosis apparatus. Hence, the result of the self-test performed on the foreign object identification can be displayed directly to a user, and the user can then immediately initiate suitable measures and, by way of example, prompt a repair.

In one embodiment, the method for diagnosing a power transmission system varies the magnitude and/or intensity of the predetermined disturbance introduced into the monitoring region.

In a further embodiment, a malfunction in the sensor is determined if the received response signal exceeds/drops below a predetermined threshold value.

The present invention additionally comprises a system for charging a motor vehicle, particularly an electric vehicle, having a motor vehicle that has an electrical energy store and a power transmission system according to the invention.

BRIEF DESCRIPTION OF THE DRAWINGS

Further embodiments and advantages of the present invention will be obtained from the detailed description below with reference to the appended drawings, in which.

DETAILED DESCRIPTION

Although the present invention is described below in connection with the charging of a traction battery of an electric vehicle, the present invention is not limited to this application. Furthermore, the present invention can be used for all further inductive power transmission systems that have, between primary coil and secondary coil, a spatial region that objects can enter. In particular, the present invention can be used for any further applications that involve the use of inductive power transmission for charging an electrical energy store.

Figure 1:
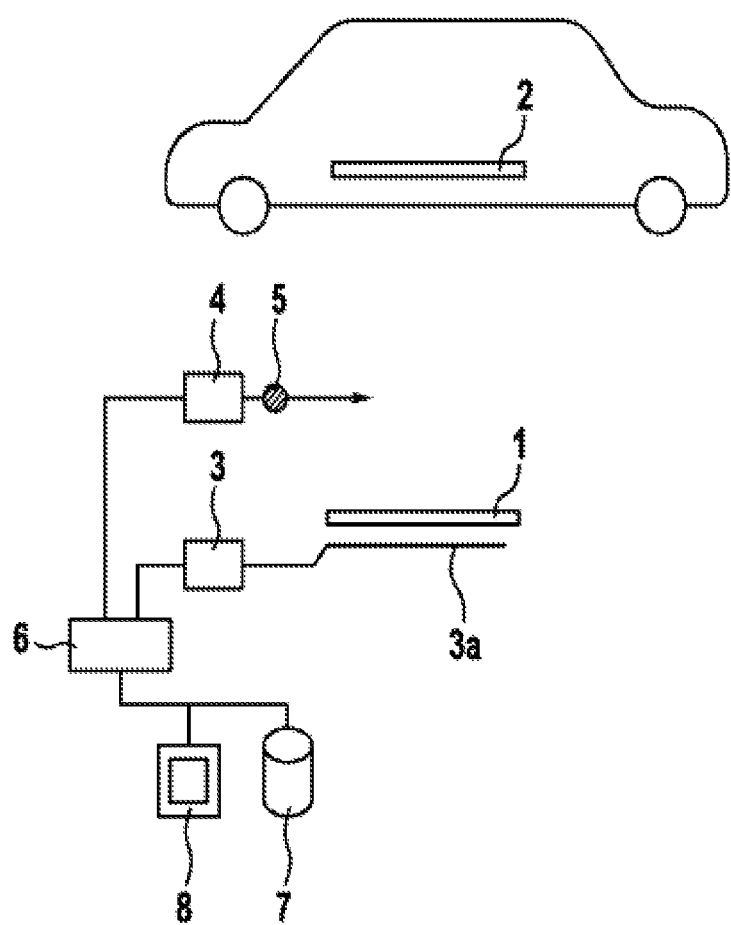
FIG. 1: shows a schematic illustration of a power transmission apparatus according to an exemplary embodiment.

FIG. 1 shows a schematic illustration of a power transmission apparatus for inductive power transmission from a primary coil 1 to a secondary coil 2. In this case, the interspace between the primary coil 1 and the secondary coil 2 is monitored by a detector 3. In the example presented here, this is a metal detector, for example, that can use additional test coils 3a to detect a metallic foreign object in the interspace between primary coil 1 and secondary coil 2. Alternative monitoring systems, such as ultrasonic detectors, radar sensors, cameras or the like, for example, are furthermore likewise possible.

The power transmission apparatus additionally has an apparatus 4 for introducing a disturbance. In this case, following appropriate actuation, this apparatus 4 introduces a defined object 5, for example a metallic article, into the interspace between primary coil 1 and secondary coil 2.

When the operational state of the detector 3 needs to be checked, a diagnosis apparatus 6 first of all actuates the apparatus 4 for introducing a disturbance. The apparatus 4 then introduces the defined object 5 into the interspace between primary coil 1 and secondary coil 2. The diagnosis apparatus 6 then receives a signal from the detector 3 and evaluates this signal. If the magnitude of the received signal is sufficient to identify a foreign object, the diagnosis apparatus 6 can confirm the operational state of the detector 3 as diagnosis information. If the received signal from the detector 3 is not sufficient to allow reliable foreign object identification following introduction of the object 5 into the interspace between primary coil 1 and secondary coil 2, then the piece of diagnosis information generated by the diagnosis apparatus 6 indicates a malfunction in the detector 3.

The diagnosis information determined in this manner from the diagnosis apparatus 6 can then be stored in a suitable memory apparatus 7, for example. Additionally or alternatively, the determined piece of diagnosis information can also be displayed on a display apparatus 8. Hence, a user can directly identify the operational state or a malfunction in the detector 3 and then if need be initiate suitable countermeasures, for example a repair.

In this case, the determined piece of diagnosis information from the diagnosis apparatus 6 can also be supplied to the bus system of a vehicle. By way of example, the diagnosis apparatus may, for this purpose, be connected to the communication interfaces of a vehicle via a suitable interface, such as OBDII, K-line, CAN bus or the like, for example. This allows direct communication by the diagnosis apparatus 6 with an onboard diagnosis system of the vehicle.

In this case, the individual components, such as detector 3, apparatus 4 for introducing a disturbance and the diagnosis apparatus 6, may all be arranged with the primary coil 1 or the secondary coil 2, as shown. Alternatively, it is likewise possible for all components for the foreign object identification and the self-test on the foreign object identification to be arranged with the secondary coil 2.

In a further embodiment, the individual components may also be arranged on different sides. If the individual components are not all arranged on the same side, then it is furthermore possible for the individual components to be coupled to one another via suitable interfaces. Preferably, the individual components are coupled to one another via wireless communication interfaces in this case. By way of example, the communication interfaces used for this purpose may be the already available communication channels of the inductive power transmission system.

The self-test on the detector 3 of the power transmission apparatus, which is carried out by the diagnosis apparatus 6, can be initiated manually by a user in this case. Alternatively, it is also possible for the self-test to be carried out automatically.

By way of example, such a self-test can be carried out regularly before or at the beginning of an inductive power transmission. Automatic diagnosis at regular intervals of time or in each case after a determined number of power transmission processes is also possible.

Figure 2A:
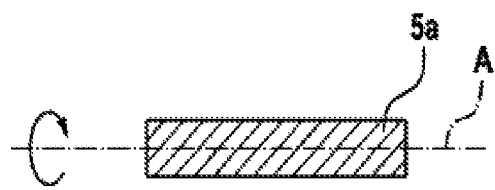
FIGS. 2a and 2b: show a schematic illustration of an apparatus for introducing a disturbance according to an exemplary embodiment.
Figure 2B:
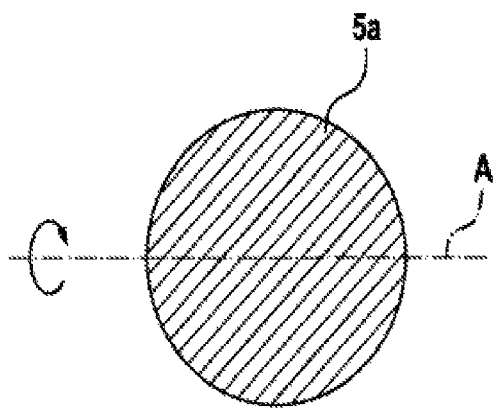

FIGS. 2a and 2b show an alternative embodiment of an apparatus 4 for introducing a disturbance into the interspace between primary coil 1 and secondary coil 2. In contrast to the embodiment shown in FIG. 1, in which an object 5 of a defined magnitude is introduced into the interspace between primary coil 1 and secondary coil 2, the exemplary embodiment presented here involves a flat object 5a being rotated about an axis A. FIG. 2a initially shows the flat object in a plan view from above, i.e. in the direction of primary coil 1 as seen from the secondary coil 2. In this case, the flat object by 5a initially has a relatively small cross section as seen in this direction. To enlarge the effective cross section of the disturbance caused by the object 5a, the object 5a is rotated through 90° about the axis A, as shown in FIG. 2b, the object 5a then having a much larger effective cross section as seen in the direction from the secondary coil 2 to the primary coil 1.

During the rotation from the position presented in FIG. 2a to the position presented in FIG. 2b, the effective cross section of the object 5a is continuously enlarged. If, by way of example, the angle of rotation of the object 5a is also monitored in this case, then the effective cross sectional area can be inferred from this angle of rotation. By comparing the angle of rotation or the effective cross sectional area with the respective signal that is output by the detector 3, it is then possible for the current response threshold of the detector 3 to be determined by the diagnosis apparatus 6.

Figure 3:
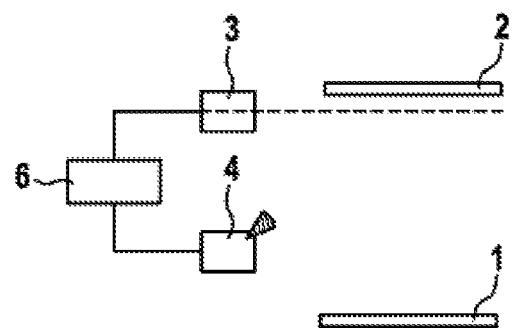
FIG. 3: shows a schematic illustration of a power transmission apparatus according to a further exemplary embodiment.

FIG. 3 shows a schematic illustration of a power transmission apparatus for inductive power transmission according to a further exemplary embodiment. In this case, the apparatus 4 for introducing a disturbance is embodied as a heat source. Multiple separate heat sources are also possible. By way of example, this heat source may be a heating element, a thermal radiator or the like. Similarly, a laser beam is possible, which specifically heats a point or an area in the interspace between primary coil 1 and secondary coil 2. This option affords the advantage that the position and size of the region to be heated can be adjusted almost arbitrarily.

Such a heat source allows particularly detectors 3 that detect an object in the interspace between primary coil 1 and secondary coil 2 on the basis of a temperature variation to be checked. By way of example, such a detector might be a passive infrared sensor or the like.

The diagnosis apparatus 6 can output a piece of diagnosis information that indicates a malfunction in the detector 4 right after a malfunction in the detector 4 that has been detected as a one-off. Alternatively, following a detected one-off malfunction in the detector 6, it is also possible for a fresh self-test on the detector 4 to be performed in order to preclude a possible disturbance, for example on account of external influences or the like. In addition, it is also possible for the diagnosis apparatus 6 to output a malfunction in the detector 4 as a piece of diagnosis information only when a predetermined number of malfunctions have been ascertained by the diagnosis apparatus 6.

Figure 4:
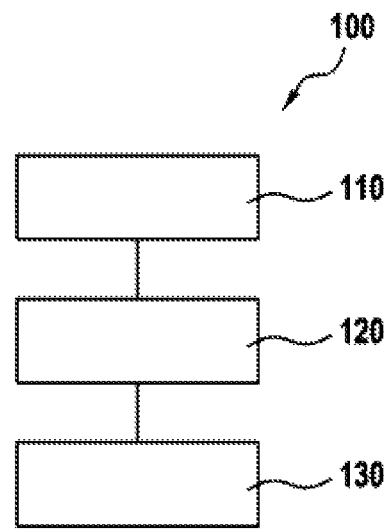
FIG. 4 shows a schematic illustration of a flowchart as forms the basis for a method for diagnosing a power transmission system according to a further exemplary embodiment.

FIG. 4 shows a schematic illustration of a flowchart as forms the basis for a method 100 for diagnosing an inductive power transmission system with foreign object monitoring according to an exemplary embodiment. In step 110, a predetermined disturbance is first of all introduced into a monitoring region of the foreign object monitoring. By way of example, the predetermined disturbance may be one of the previously described disturbances in the form of a defined object, a rotating object, or may be generation of heat. In step 120, a detection signal is then received from the foreign object monitoring after the predetermined disturbance has been introduced into the monitoring region of the foreign object monitoring. A piece of diagnosis information is then determined in step 130 using the received diagnosis signal.

In this case, the predetermined disturbance in the monitoring region can be varied in terms of both magnitude and/or intensity. In this case, the determined diagnosis function determines a malfunction in the sensor when the received diagnosis signal exceeds or drops below a predetermined threshold value.

In summary, the present invention relates to diagnosis of foreign object identification in an inductive power transmission system. To this end, a defined disturbance is introduced into the region to be monitored between primary coil and secondary coil in the inductive power transmission system, and the response of the foreign object identification to this defined disturbance is evaluated.

The invention claimed is:

1. A power transmission apparatus for inductive power transmission from a primary coil to a secondary coil, the apparatus comprising:
   a detector that is designed to detect a predetermined disturbance in an interspace between the primary coil and the secondary coil and to output a detection signal;
   an apparatus that introduces the predetermined disturbance into the interspace between primary coil and secondary coil, the predetermined disturbance being one selected from the group consisting of a defined object, a rotating object, and generation of heat; and
   a diagnosis apparatus that is designed to actuate the apparatus for introducing a disturbance, to receive the output detection signal from the detector and to determine a piece of diagnosis information using the received detection signal from the detector.

2. The power transmission apparatus as claimed in claim 1, wherein the apparatus for introducing a disturbance varies the magnitude the intensity of the introduced disturbance.

3. The power transmission apparatus as claimed in claim 1, wherein the defined object is a metallic object into the monitoring region.

4. The power transmission apparatus as claimed in claim 1, wherein the apparatus for introducing a disturbance is a heat source.

5. The power transmission apparatus as claimed in claim 1, additionally comprising a memory that is designed to store the piece of diagnosis information determined by the diagnosis apparatus.

6. The power transmission apparatus as claimed in claim 1, additionally comprising a display apparatus that is designed to display the piece of diagnosis information determined by the diagnosis apparatus.

7. A system for charging a motor vehicle, the system comprising:
   a motor vehicle that has an electrical energy store; and a power transmission apparatus as claimed in claim 1.

* * * * *